June 11, 1968 R. A. FLOWER 3,388,259
PHOTOSENSITIVE SURFACE FINISH INDICATOR
Filed March 22, 1965 3 Sheets-Sheet 1

INVENTOR.
ROBERT A. FLOWER
BY
ATTORNEY

INVENTOR.
ROBERT A. FLOWER
BY H. A. Mackey
ATTORNEY

United States Patent Office 3,388,259
Patented June 11, 1968

3,388,259
PHOTOSENSITIVE SURFACE FINISH
INDICATOR
Robert A. Flower, White Plains, N.Y., assignor to
General Precision Systems Inc., a corporation of
Delaware
Filed Mar. 22, 1965, Ser. No. 441,490
16 Claims. (Cl. 250—219)

The present invention relates to a system or device for remotely measuring the roughness or finish of a surface. More particularly the present invention is a radiant, electromagnetic energy system or device, particularly operating in the optical frequency range, which has the unique ability to automatically detect and measure surface roughness without physical contact with the surface being measured.

The novel approach of the noncontacting surface roughness or surface finish measuring system has many far reaching advantages over contemporary and/or conventional surface roughness measuring devices or systems.

An example of a conventional device for measuring surface roughness is a probe which is used manually and drawn across the surface to be measured. The probe makes contact with the surface and upon being drawn across the surface an indicator shows the degree of roughness. This method has several disadvantages. Its use on soft and/or sensitive surfaces is very limited. The probe is subject to wear and the factor of human error is present.

Another example is a balanced stylus which is drawn across a surface under controlled pressure. This arrangement also has limited use on soft and/or sensitive surfaces and the stylus is subject to wear. Human error is somewhat reduced by balancing of the stylus. This latter arrangement measures surface irregularities electronically by the vibrations or fluctuations of the pickup output current.

A further arrangement, which avoids physical contact of the surface to be measured, is a comparison microscope. This method, however, introduces a large degree of human error since an observer compares the surface to be measured with a sample specimen.

It is obvious that these methods are not practical to use on very small surfaces, irregular contour surfaces and/or surfaces to which access is difficult.

The present invention provides a system or device which automatically detects and measures surface roughness or finish without making physical contact with the surface to be measured and without the need of human comparison.

In addition, the present invention permits measurement of normally inaccessible surfaces such as the bearings and races of assembled ball and/or roller bearings and/or gears mounted in an assembly.

Another advantage of the present invention is that surfaces having irregular and/or complex surface contours, such as gear teeth and tapered shoulders and ball and/or roller bearings may be measured.

The sensitivity of the present surface measuring system leads itself to detection and measurement of normally invisible grooves and/or notches as well as measurement of roughness of very small surface areas.

Obviously, any device that makes contact with a surface for measurement of roughness and/or finish has limited use on soft and/or sensitive surfaces and will suffer wear which will develop errors which become progressively greater due to such wear. The present system avoids contact with the surface being measured and therefore soft and/or sensitive surfaces may conveniently be measured and the element of wear of the detection or measuring device is eliminated. This feature alone, increases its useful range and results in constant uniformity of measurement thereby providing a more useful device and a more reliable surface measuring device.

These are but some of the basic and obvious advantages of the present novel noncontacting surface roughness or finish measuring device.

By using the technique taught herein, very small area surfaces may be measured which heretofore had to be measured by eye and/or by feel and, in some cases, were inaccessible to actual measurement.

The present invention also provides for automatic detection and measurement of surface roughness uniformity. By employing a device using the basic principles herein described, a control means may be provided for a surface finishing device, regardless of the sensitivity of the surface. For example, the efficiency of a polishing or surface finishing device may be easily, remotely and automatically detected and controlled. Such control may assure uniformity of finished surfaces.

The term "electromagnetic energy" as used herein refers to energy in the optical frequency range and includes both visible and invisible light wave energy. The present description of the invention is presented employing visible light wave energy, such as that provided by a laser.

When a monochromatic, highly collimated beam of radiant energy, such as that generated by a visible wavelength laser, for example, is directed to and meets a scattering surface, the illuminated spot on the surface has a sparkling granular look. Such illuminated spot produces a reradiated or scattered random pattern of needle-like lobes of energy. This pattern as viewed via a ground glass screen is seen as a field of irregular light and dark spots which may be referred to as peaks and nulls. This phenomenon is described by B. M. Oliver in a letter to and published in, Proceedings of the IEEE, vol. 51, 1963 on pages 220 and 221.

The random pattern is the result of several contributing factors. First, light wave energy such as produced by a laser, for example, is composed of a plurality of very small length waves. Thus, a minute section of the contour of a surface may reradiate the incident light wave at various angles and therefore propagate the scattered waves at individual angles and with various phase delays as a function of the local surface roughness or contour. Second, the phase fronts in the incident beam of energy are parallel to each other, which, adding to the feature of the very small length of the waves, permits correlation of phase change in the scattered waves with irregularities in the contour of the reflecting surface. Third, the propagated laser wave energy is highly coherent so that the phase of reflection of successive waves falling on the same point on the surface at the same angle of incidence is constant. Thus, the individual angle and phase change caused by reflection of the individual light waves of the beam will be maintained when the light beam is maintained at a constant angle of incidence and is directed at the same spot on the surface.

Each point in the reradiated pattern represents the vector sum of the resultant of various angular reflections of individual light waves arriving at that point. A peak is produced, for example, wherever the individual waves arrive in phase, and interfere constructively; a null is produced wherever the individual waves interfere destructively. The minute irregularities of the illuminated surface produce irregularities in the reradiated pattern which gives rise to this interference phenomenon. In other words, the angle of reflection of the individual light waves and the phase change varies across the surface area as a function of the fine contour of the surface.

The nulls and peaks of the reradiated energy may be readily seen when a view of a selected portion of the illuminated area is observed and magnified, as by use of an optical system employing a diffraction limited forming lens.

By using an optical system employing a diffraction limited lens, the individual light waves captured by the lens may be projected as an image. A lens functions in such a manner that each point on the object plane has a conjugate point on its image plane. The lens captures light energy from each object point, and by the refractive principle directs this amount of light energy to the proper image plane point. In other words, it images light from one and only one object point at each point in the image plane.

The resolution capability of the lens determines the size of an object point that can be faithfully reproduced in the image plane. All object points which are smaller than the resolution limit dimension of the lens in the object plane are imaged as points having a diameter equal to the resolution limit size in the image plane. If the optical system is diffraction limited as in the present case, the resolution limit dimension in the object and image planes are respectively, $$l_o = \frac{\lambda}{D} p$$

and $$l_i = \frac{\lambda}{D} q$$

where $\lambda$ is the wavelength, D is the diameter of the lens opening, $p$ is the object-lens distance and $q$ is the lens-image distance.

It can be seen therefore that each resolution limit area in the image plane receives light energy from just one small zone of the object, and the size of these zones is inversely proportional to the size of the lens opening. It can also be seen that if the object is illuminated with monochromatic, highly collimated light energy, that interference can occur within each resolution limit area.

That is, the individual facets or scattering centers of a surface may be quite small. The lens opening as described above can be selected, in fact, so that each resolution limit area includes two or more such scattering centers. When this is the case, for a given angle of incidence of the laser beam on the surface under test, constructive or destructive interference will occur within each resolution limit area. This will produce, in sum, a multiplicity of randomly placed bright peaks and dark nulls in the image plane.

It has now been discovered that when the angle of incidence of the light beam is changed from an initial angle to another angle the overall pattern of reflected energy changes correspondingly. This change is seen as a change in the fine structure of the pattern in that peaks become nulls, nulls become peaks and granules change shape. In addition, it has been found that this degree or rate of pattern structure change is a function of the surface roughness of the reflecting surface. Experimentation has demonstrated that the reflection pattern produced by a relatively rough surface finish changes more for a given change in angle of incidence, than the pattern produced by a relatively smooth surface throughout the same change in angle of incidence. This is the fundamental phenomenon on which the present invention is based.

It is therefore a principal object of the present invention to provide a device for detecting and measuring the roughness of a surface according to the rate of change of the pattern of reradiated energy directed onto the surface of the material over a given change in angle of incidence.

Another object is to provide a device operating in the optical frequency range for directing energy onto a surface through a predetermined change of angle of incidence and for detecting and measuring the rate of change in the pattern of the reradiated energy from the reflecting surface as a measure of the roughness of the reflecting surface.

It is another object of the present invention to provide an automatic system for detecting and measuring the surface roughness of an area without making physical contact with the surface so detected and measured.

Another object is to provide a non-contact microwave energy surface roughness or finish detecting and measuring system or device which will detect and measure roughness of very small and/or normally inaccessible surfaces.

Another object is to provide a non-contact surface finish or roughness detecting and measuring device which eliminates both machine and human error normally associated with contact surface finish or roughness detecting and measuring devices.

Another object is to provide a non-contact surface finish or roughness detecting and measuring device which has great sensitivity for detecting and measuring surface irregularities so as to be capable of detecting and measuring normally invisible surface irregularities such as grooves and notches.

These and other objects (which may be consistent with the many advantages of the present invention) will become more obvious from reading the following detailed description in conjunction with the accompanying drawings in which.

Figure 1:
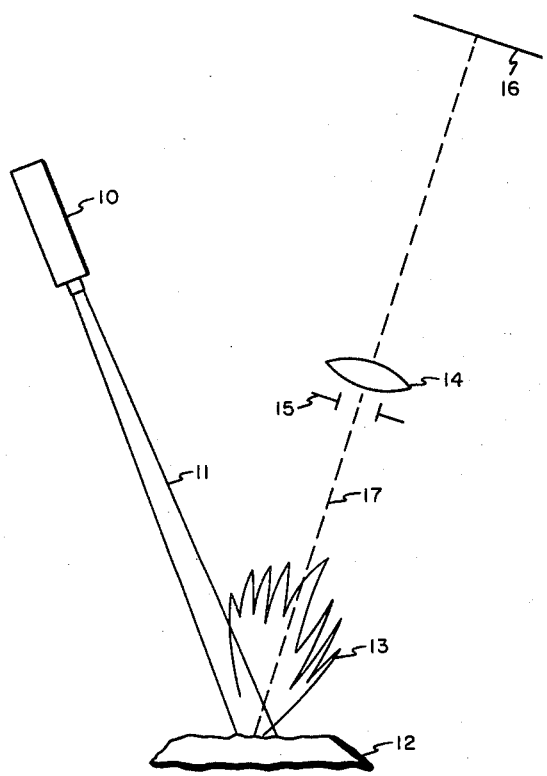
FIG. 1 represents the basic apparatus employed in the system.

Referring to FIG. 1, a representation of basic apparatus, in simplified form, is shown in which an electromagnetic wave energy generator and transmitter, such as a laser, represented by 10, directs a beam of light energy 11, to the surface of a test specimen 12, on which the roughness of the surface finish has been exaggerated. The direction of the reflected or reradiated energy from the surface of the specimen 12 is represented as 13 and is shown irregular. This irregular reradiated energy is developed because of the irregularity of the surface roughness of the test specimen 12 and is intended to represent a nonuniform angular reflection of very small length, coherent waves of optical energy that results from the surface roughness. Lens 14 represents a diffraction limited lens which is positioned so that the axis of the beam 11 and the axis of the lens 14 converge on the surface of the specimen 12. In order to limit the amount of reradiated optical energy captured by the lens and to more particularly control the size of the sampling area, an iris 15 is positioned between the lens 14 and the reflecting surface 12 with the axis of the lens substantially centered in the iris. In order to clearly display the pattern of reradiated energy from the point of conversion of the axis of the beam 11 and the axis or line of sight of the lens 14, a screen 16 is provided on which an image of the pattern of the reradiated energy is projected.

It will be found that the diffraction effects of the surface roughness will produce a particular type of pattern on the screen 16, which, under suitable magnification, will have a granular appearance of irregular light and dark spots of varied intensity and shape.

Let it be assumed that the test specimen 12 has a surface roughness of R1, for example. This may represent any particular degree of surface finish or roughness, and a pattern of the reradiated energy would be produced on the screen 16. If, for example, the test specimen having a surface roughness R1 were removed and replaced with a test specimen having a surface roughness R2, it will be seen that the reradiated energy pattern, as produced on the screen 16, would be in substantially the same form as the pattern provided by the surface R1.

The structure of the reradiated energy pattern as developed on the screen 16 by use of a diffraction limited lens will, in general, have an appearance similar to that of the diffraction pattern that may be produced if the individual waves of reradiated light fell directly on the screen. However, when the reradiated light falls directly on a screen, without passing through a lens, each granule of the pattern of reflected energy is the resultant of contributions from all parts of the illuminated area. By contrast, if a lens is interposed between the screen and the reflecting surface, and is so placed that the axes of the beam 11 and the lens meet on the surface of the specimen, then each granule represents the resultant of contribution from one and only one lens resolution-limit area on the illuminated surface. The granular pattern provided by this arrangement is seen as peaks and nulls of reflected or reradiated light.

It will be appreciated that the angle of incidence (the angle between the normal to the surface of the specimen and the axis of the beam 11) and the viewing angle (the angle between the normal and the axis through the lens 14 represented by broken line 17) may be adjusted so as to lie in the same plane and to have some equal, arbitrary value.

Now, let it be assumed that the laser 10 is angularly displaced from its position relative to the surface at which the beam 11 is directed. Thus, the angles of incidence and reflection are changed. This changes the angle of incidence and reflection from each part of the contour of the surface correspondingly. With such change in the angle of reflection of the individual light waves (a function of the contour of the surface) a change in the fine structure of the pattern produced on the screen will occur. The fine granules of light peaks and nulls will change in intensity, shape and position and the overall distribution of reflected energy in the pattern will also change.

Through experimentation it has been found that although the pattern of reflected energy changes randomly the rate at which such change occurs is directly related to the degree of surface roughness.

Parenthetically, when experimenting with specimens having the same degree of surface roughness it was found that the rate of change, although involving statistical variations, is on the average the same when the angle of incidence was changed from a first common value to a second common value. This phenomenon of the rate of change of the pattern of the reradiated energy has been found to exist with a great degree of consistency, to the extent that a measure of the surface roughness may be determined in accordance with the amount or value of angular displacement of the angle of incidence necessary to provide a predetermined change of the reradiated light energy pattern. It is also possible to determine the measure or degree of surface roughness of an unknown surface according to the rate of change in the reradiated energy pattern in response to a predetermined change in the angle of incidence. Thus, it has been determined that the rate of pattern change is a function of the surface roughness.

Figure 2:
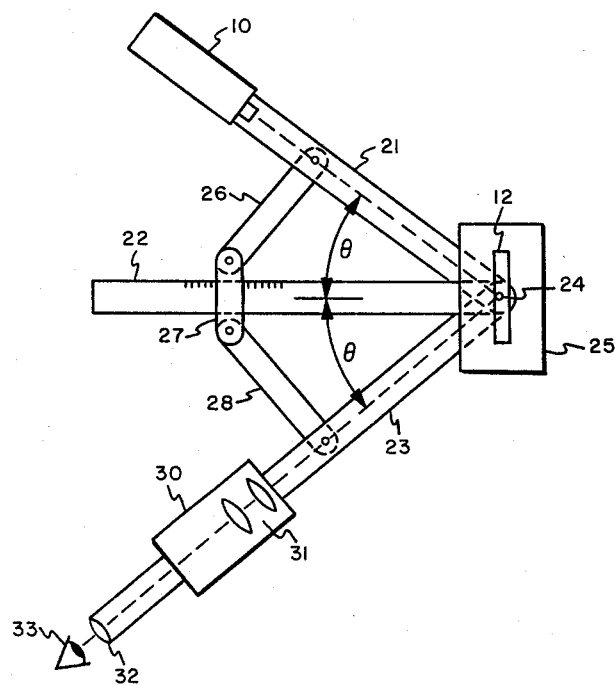
FIG. 2 represents a device employing the fundamental principals of the invention using visual detection and observation.

In order to observe this phenomenon more clearly, an arrangement such as shown in FIG. 2 may be employed. Such arrangement has been used to demonstrate and observe visually the rate of change in appearance resulting from a change of incidence of the beam of transmitted energy.

The apparatus represented in FIG. 2 provides for changing both the angle of incidence and the angle of view correspondingly so as to maintain equality between these angles. By the method of maintaining equality between the angle of incidence and the viewing angle, the observed pattern remains stationary in the field of view. Since the area pattern viewed remains substantially the same area pattern, the change in the characteristics of the granules or lobes making up the pattern is thereby made to appear more pronounced. Additional advantages in maintaining such angular equality is that less energy is required to obtain a pattern of satisfactory visibility, and the effects of vertical and horizontal components of roughness may be evaluated and measured separately.

The apparatus includes arms 21, 22 and 23 with arms 21 and 23 pivotally mounted on a common axis at a point 24 and arm 22 in a fixed position. To avoid confusion only the basic parts of the apparatus are represented thus, the framework, which supports the specimen mount 25, to which the arms are connected, has been eliminated. The arm 21 is coupled to arm 22 by a member 26 and part of link 27 while arm 23 is connected to arm 22 by member 28 and part of link 27.

As indicated an angle $\theta$ is maintained between arms 21 and 22 and between arms 22 and 23 by the sliding divider linkage including members 26 and 27, and 27 and 28 respectively. This linkage maintains the desired angular relationship of incidence and view regardless of the value of $\theta$. The arm 22 may serve as a guide along which the member 27 may slide so as to change the value of $\theta$. Thus both the angle of incidence and the angle of reflection may be changed correspondingly. The position of the sliding divider 27 may be calibrated in degrees of angular change of the value of $\theta$.

The arm 21 serves as a mounting arm on which a laser 10 is mounted. The laser is positioned so as to direct a light beam onto the surface of the specimen 12 at a point which intersects with the principal axis of the lens assembly 30, mounted on the lens assembly mounting arm 23. The lens assembly includes lenses 31 and 32, with lens 31 serving to magnify the reradiated pattern and lens 32 serving as a focussing lens. The eye 33 represents an observer.

By sliding the divider 27 along the guide arm 22 the value of the angles $\theta$ will be changed. As the value of $\theta$ changes, changes in the characteristics of the pattern formed by reradiation of the energy from the surface roughness of the specimen may be observed by an observer. The initial position of the sliding divider 27 may be observed and the pattern formed by reradiation may be observed. The divider 27 may be moved or slid along the guide arm 22 so as to essentially change the value of angle $\theta$ a predetermined value and the rate of change of the pattern formed by reradiation from a surface having a roughness R1, for example, may be observed. The same procedure may be repeated after replacing the specimen having a surface roughness R1 with another specimen having a surface roughness R2, for example. A difference in rate and therefore the degree of change of the reradiated pattern will be observed over the same angular change.

In the alternative, the initial position of the sliding divider 27 may be noted and the pattern from the surface of a specimen (R1) may be observed. The sliding divider may then be moved and a predetermined change of characteristic of the pattern may be observed. When the predetermined rate or degree of change is completed, the angular change may be noted. This process may be repeated using a specimen having a different surface roughness, R2, for example. It will be seen that the same predetermined rate or degree of pattern change will take place during a different angular differential. This simplified arrangement has been employed to show that this phenomenon exists and that the rate of change of characteristic of a reradiated pattern is related to the degree of surface roughness as against the change in the angle of incidence. The degree of surface roughness may be determined by the angular differential required to provide a predetermined change of appearance or characteristic of the reradiated pattern.

The laser 10 employed in the arrangement shown in FIG. 2 may be transmitting a continuous wave (CW) signal or may be transmitting a pulsed signal.

Thus it has been shown how a reradiated energy pattern may be obtained and I will now describe how such pattern change may be employed in a device for detecting and/or measuring surface roughness or finish.

Figure 3:
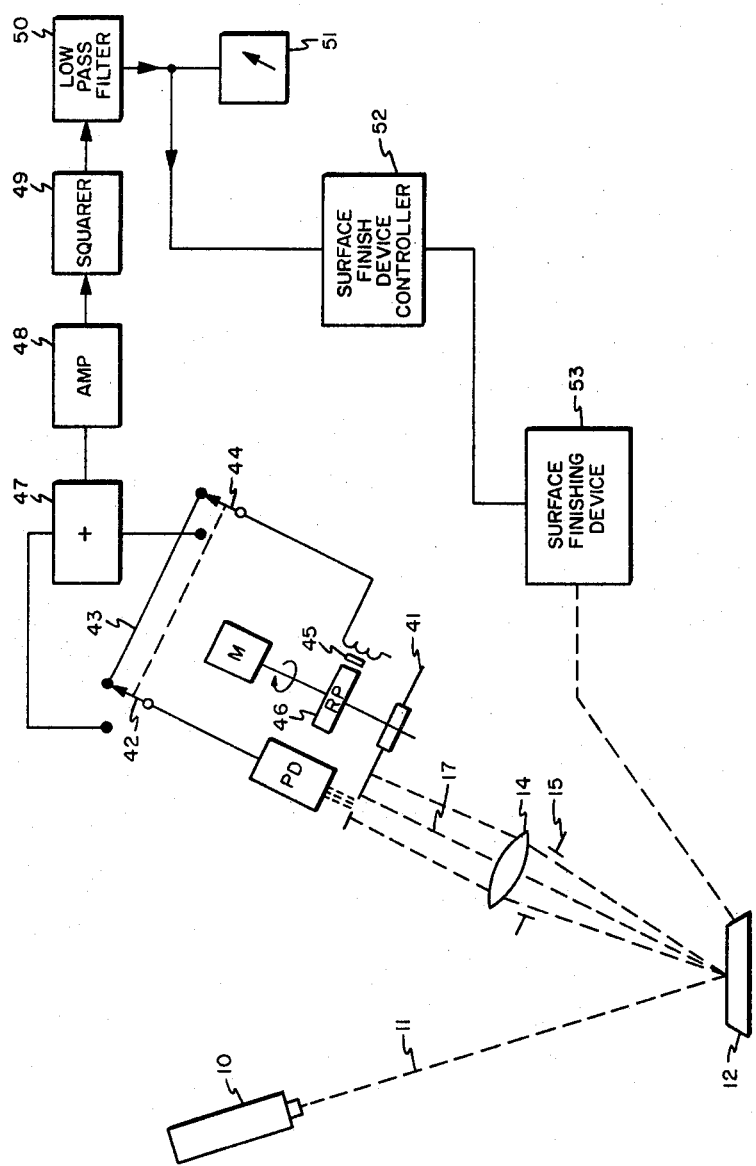
FIG. 3 represents, partly in block form, a non-contacting electromagnetic wave energy surface roughness or finish detecting and measuring device employing the principles of the present invention.

Accordingly, FIG. 3, represents an automatic non-contact electromagnetic wave energy surface roughness indicator, which employs the basic principles of the phenomenon described above. It should be noted that throughout the several drawings common components have been labeled with identical reference characters.

The device shown illustrates one form of apparatus by which a comparison or correlation of the initial pattern of reflected energy and a changed pattern of reflected energy may be detected on the basis of a sampling of the pattern provided. The device illustrated also provides for measuring the rate of change in pattern characteristics and for indicating such change as a measure of surface roughness.

A laser 10 provides electromagnetic wave energy, in the form of a light beam, which is directed at the surface of a specimen 12. The initial angle of incidence is non-critical, as will be obvious from the operation of the device described below.

The laser 10 may be mounted so that the angle of incidence may be conveniently determined and conveniently changed, as desired. The optical system may be mounted so that the line of sight of the optical system aligns with the reflection angle of the beam of the laser.

The optical system is represented in simplified form as the iris 15 and the diffraction limited lens 14. A rotatable disc is positioned so that an image of the reflected energy is projected on a part of the disc. The disc is opaque, except for a transparent slot which is used to scan the image projected on the disc when the disc is rotated by the motor M. With this construction a sampling or profile of the variations in intensity of the pattern is obtained and applied to a photodetector which converts the light energy of the pattern so sampled to a corresponding alternating current, which is pulsed in accordance with the rate of rotation of the disc 41. The output of the photodetector is applied through a switch 42 to a bridging conductor 43 and through switch 44 to a record/playback head 45 of a storage means, such as an endless magnetic tape which may be on the periphery of a drum 46, for example. The drum 46 is coupled to and rotated by the motor M in a manner so that the disc 41 and the drum 46 are driven in synchronism.

Thus, one way has been illustrated showing how to store a signal representing a sampling or scan profile of the pattern of the reflected or reradiated energy from the surface 12. It will be noted that the switches 42 and 44 are connected with a broken line thereby indicating that these switches work in unison.

With the scan profile or sampling of the light energy image of the pattern stored magnetically on the magnetic tape, the stored signal may be preserved and compared with another scan or sampling by repositioning the switches 42 and 44. When the switches are repositioned the signal on the magnetic tape may be played back through the record/playback head 45 and may be applied to a summing circuit 47. At the same time another scan of the image may be applied to the photodetector and the alternating current output, corresponding to the light energy of the second scanned image applied to the summing circuit 47. The output of the summing circuit 47 may be amplified as by amplifier 48 and thence squared by a squaring circuit 49. A low-pass filter 50 may be employed to attenuate the high frequency components of the squared signal and pass the low frequency components to an indicator meter 51.

The squaring circuit 49 and the low-pass filter 50 constitute a cross-correlator which determines the average product of the two signals at the input to the summing point. When these two signals are identical, the meter will read a maximum value; as the two signals differ (i.e., because of change in the scanned pattern profile as compared to the stored pattern profile) the low-pass filter output voltage decreases and hence the meter deflection is reduced.

Assume that the laser 10 is positioned at an angle $\theta$, and a scan or sampling of the image of the reradiated pattern is stored on the magnetic tape storage disc. This storage is accomplished with the switches 42 and 44 in the position shown in FIG. 3. Assume then that the switches 42 and 44 are repositioned and another scan or sample of the same image is made with the laser still positioned at the same angle $\theta$. Then comparison of the stored signal and the new signal would result in the indicator reading at full scale, for example.

Assume now that the laser 10 is repositioned so that the angle of incidence is $\theta_2$ (this also changes the viewing angle to $\theta_2$). As previously stated a change in the angle of incidence using the same specimen will change the pattern of the reflected energy. Thus when the changed pattern is scanned the new scan or sampling will provide a slightly different signal at the output of the photodetector PD and this new signal may then be compared with the stored signal. The decorrelation or change between the two signals may be measured on the meter 51.

When the meter deflection reaches a predetermined value, the angular differential between $\theta$ and $\theta_2$ may be noted, which differential may serve as a measure of the surface roughness.

In the alternative, several scans may be made throughout a predetermined differential of angular incidence and the meter indication may be used as a measure of surface roughness. This latter procedure may include that the meter or indicator be calibrated in surface roughness, which may be done. In the former procedure the differential of the angle of incidence may be calibrated in surface roughness or a chart may be used to convert angular differential into surface roughness.

Obviously the device illustrated in FIG. 3 is shown in a simplified form and interconnection structure, which is believed to be obvious has been omitted. The summing circuit, amplifier, squaring circuit, low-pass filter and photodetector may be of readily available components, the details and functions of which are well known in the art.

In accordance with the signal output of the low-pass filter 50, a controller such as 52, which may be a surface finish device control means, may control a surface finishing device, such as 53. The controller 52 may control operation of the finishing device 53 so that when a predetermined degree of surface finish is detected, as indicated by the ability to vary the angle $\theta$ to a relatively large value before significantly reducing the voltage output of 50, the finishing device 53 may be cut off under control of the controller 52.

It should be pointed out that the present device has great mobility and, as a mobile device, which operates from a remote position from the surface being detected, parts of a device which may be internal to a framework and still coupled in the device may be scanned to accord detection and measurement of a component surface. Thus, the surface of components, such as gears, ball bearing, bearing races, etc., may be detected and measured without removing elements from the component. One example may be the detecting and/or measuring of the surface of a ball bearing or roller bearing while it is still positioned between races. The surface finish of races may also be detected and measured when in a bearing assembly. Another example may be the use of the present device to detect and measure the surface finish of precision components in a watch or other device having very small and normally inaccessible parts without dismantling or disassembling the device.

Obviously other arrangements of the present invention, as by substitution and rearrangement of parts, as will be known to those skilled in the art, may be made within the spirit of the invention as defined in the appended claims.

What is claimed is:

1. Apparatus for measuring the roughness of a surface including,
   means for generating and transmitting electromagnetic wave energy on to a surface,
   optical means for receiving a diffraction image of said electromagnetic wave energy reflected from said surface,
   means for detecting the amplitudes of the waves of energy reflected from said surface to said optical means in accordance with the angle of reflection as a function of the roughness of the said surface,
   means for generating a first alternating current signal representative of the said amplitudes,
   means for storing said first alternating current signal,
   means for generating a second alternating current signal representative of the said amplitudes,
   means for comparing said first alternating current signal and said second alternating current signal, and
   means responsive to such comparison for providing an output corresponding to the difference between said first and second alternating current signals.

2. Apparatus for measuring the roughness of a surface including,
   means for generating electromagnetic wave energy and for transmitting a beam of said wave energy so generated on to a surface,
   optical means for detecting a diffraction image of the electromagnetic waves reflected from said surface and for providing an image pattern of the said reflected waves corresponding to the angular reflection of such waves as a function of the roughness of said surface,
   sampling means for sampling said image pattern,
   means for storing a first sampling in synchronism with said sampling means,
   means for comparing a second sampling from said sampling means with the first stored sampling, and
   means responsive to such comparison for providing an output corresponding to the difference between the first sampling and the second sampling.

3. Apparatus for measuring the roughness of a surface including,
   means for generating and transmitting electromagnetic wave energy in a beam to a surface, said beam being directed at a first angle,
   optical means for receiving a diffraction image of said wave energy reflected from said surface,
   means for detecting a selected portion of the amplitudes of said reflected energy so received by said optical means in accordance with the angle of reflection as a function of the roughness of said surface,
   means for generating a first alternating current signal representative of the said amplitudes so detected,
   means for storing said first alternating current signal,
   means for directing said beam to said surface at a second angle,
   means for detecting a corresponding portion of the amplitudes of the energy of the second directed beam reflected from said surface as received by said optical means,
   means for generating a second alternating current signal representative of said corresponding portion of the amplitudes,
   means for comparing said first and second alternating current signals,
   means responsive to such comparison for providing an output the value of which is representative of the difference between said first and second alternating current signals, and
   means responsive to the value of said output for indicating the roughness of said surface.

4. Apparatus for measuring the roughness of a surface including,
   means for generating and directing a beam of light waves on to a surface at a desired angle of incidence,
   optical means for receiving the reflected light waves from said surface so reflected to said optic means,
   means for detecting the intensities of the individual reflected light waves in accordance with the angle of reflection from said surface as a function of the roughness of said surfaces,
   means for converting the reflected light waves so detected into a first electric energy signal corresponding to the intensities of said light waves so detected,
   means for storing the said electric energy signal,
   means for converting the reflected light waves so detected into a second electric energy signal corresponding to the intensities of said light waves so detected,
   means for comparing said first and second electric signals, and
   means responsive to such comparison for providing an output voltage the value of which is representative of the difference between said first and second electric signals.

5. Apparatus for measuring the roughness of a surface as in claim 4 and further including,
   means for varying the angle at which said light beam is directed on to said surface and in which,
   said first electric energy signal corresponds to intensities of light waves detected when the light beam is directed at a first angle of incidence, and
   said second electric energy signal corresponds to intensities of light waves detected when the light beam is directed at a second angle of incidence.

6. Apparatus for measuring the roughness of a surface as in claim 5 and further including,
   means responsive to the value of said output voltage for indicating the roughness of said surface.

7. Apparatus for measuring the roughness of a surface as in claim 4 and further including,
   means for changing the angle of incidence of said beam as desired,
   means for changing the angle at which said optic means receives said reflected light waves so that,
   said first electric energy signal corresponds to the vector sum of intensities of light waves reflected when the said beam is at a first angle of incidence, and said optic means is receiving said light waves at a first angle of reflection of said beam, and
   said second electric energy signal corresponds to the vector sum of intensities of light waves reflected when said beam is at a second angle of incidence and said optic means is receiving said light waves at said second angle of reflection of said beam.

8. Apparatus for measuring the roughness of a surface as in claim 4 and in which said optical means includes,
   a diffraction limited lens for defining the area from which reflected light waves may be received and for providing an image of the pattern of reflected waves proportional in size to the object.

9. Apparatus for measuring the roughness of a surface including,
   means for generating electromagnetic wave energy in the optical frequency range,
   means for collimating said wave energy in a beam and for transmitting said wave energy to a surface at a predetermined angle,
   optical means having diffraction limited characteristics for receiving those electromagnetic waves reflected from the surface and falling on to the said optical means, said optical means providing an image pattern corresponding to the vector sum of the intensities of the said waves residing in each lens resolution element so reflected and falling on said optical means,
   generating means for generating a first electric value having characteristics corresponding to a sampling of said image pattern when said beam is transmitted to said surface at a first angle, means for storing said first electrical value in synchronism with said generating means, said generating means generating a second electric value having characteristics corresponding to a sampling of said image pattern when said beam is transmitted to said surface at a second angle, means for comparing the characteristics of said first and second electric values and for providing an output having a value representative of the difference between the characteristics, and means responsive to said output for indicating surface roughness in accordance with the value of said output.

10. Apparatus for determining the relative uniformity of roughness of a surface including, means for generating electromagnetic wave energy in the optical frequency range, means for collimating said wave energy into a beam and for transmitting said beam to a surface at a predetermined angle, means for relocating said beam with respect to the area of said surface upon which said beam falls and for maintaining said beam at the same angle of incidence, optical means having diffraction limited characteristics for receiving those electromagnetic waves reflected from a first location of the surface and falling on to the said optical means, said optical means providing a first image pattern corresponding to the vector sum of the intensities of the said waves so reflected from said first location residing within each lens resolution element and falling on said optical means, generating means for generating a first alternating current having characteristics corresponding to a sampling of said first image pattern, means for storing said first alternating current in synchronism with said sampling, said optical means additionally on relocation of said beam receiving those electromagnetic waves reflected from a second location of said surface and falling on to said optical means, thus for providing a second image pattern corresponding to the vector sum of the intensities of the said waves so reflected from said second location and falling on to said optical means, said generating means generating a second alternating current having characteristics corresponding to a sampling of said second image pattern, the sampling of said first image substantially corresponding with the sampling of said second image, means for comparing said first and second alternating current characteristics and for providing an electric value representative of the difference between the characteristics, and means responsive to said electric value for indicating the degree of uniformity of surface roughness in accordance with the value of said electric value, 11. Apparatus for determining the relative uniformity of roughness of a surface as in claim 10, further including means for coupling said generating means to said storage means for storing said first alternating current during sampling of said first image, and means for uncoupling said generating means from said storing means and for coupling said generating means and said storing means to said means for comparing during sampling of said second image for comparing said first and second alternating current characteristics during sampling of said second image.

12. Apparatus for determining the relative uniformity of roughness of a surface as in claim 10 and further including, surface finishing means for finishing the face of said surface, and control means responsive to said electric value for controlling operation of said surface finishing means in accordance with the uniformity of roughness of said surface.

13. Apparatus for measuring the roughness of a surface comprising, means for generating and transmitting monochromatic electromagnetic waves toward the surface whose roughness is to be measured at a selected angle of incidence, optical means for receiving and displaying a diffraction limited image of the electromagnetic waves reflected from said surface at an angle of reflection equal to said angle of incidence, common physical means for simultaneously varying the angles of said generating means and optical means by equal amounts for producing a preselected change in the pattern of reflected waves, and means for measuring the change in angles of said generating means and optical means required to produce said preselected change.

14. Apparatus for measuring the roughness of a surface as in claim 13 and in which said means for generating and transmitting includes a laser producing a beam of light and said optical means includes a lens having diffraction limiting characteristics and said angle of incidence is the angle between the sides of said beam and a line perpendicular to said surface, and said angle of reflection is the angle between the axis of said lens and said perpendicular.

15. Apparatus for measuring the roughness of a surface comprising, means for generating and transmitting a beam of electromagnetic waves toward the surface whose roughness is to be measured, said beam being directed at a selected angle of incidence, optical means for receiving a diffraction image of those electromagnetic waves of said beam reflected from said surface at an angle of reflection substantially equal to said angle of incidence as a function of the surface roughness, common physical means for simultaneously varying the angles of said generating means and optical means by equal amounts for producing a preselected change in the pattern of reflected waves of said beam so reflected as a function of the surface roughness, and means for measuring the change in the angles of said generating and optical means required for producing said preselected change.

16. Apparatus for measuring the roughness of a surface comprising, means for generating and transmitting a beam of a plurality of monochromatic, collimated electromagnetic waves toward the surface whose roughness is to be measured, means for positioning said generating and transmitting means for directing said beam at a selected angle of incidence measurable from the axis of said beam, optical means for receiving a diffraction image of those electromagnetic waves of said beam reflected from said surface at an angle of reflection substantially equal to said angle of incidence as a function of the surface roughness, said optical means including positioning means for selectively locating said optical means so that the angle of reflection from the surface is measurable from the axis of said optical means and said angle of reflection is equal to said angle of incidence, means for providing a pattern of the intensities of those waves received by said optical means when reflected to said optical means at a first selected angle of reflection, means for simultaneously varying said angle of incidence and angle of reflection by equal amounts for producing a preselected change in the pattern of intensities from that pattern provided by said pattern providing means when the received waves are reflected at said first selected angle, and means for measuring the change in the angle of incidence and reflection from said first selected angle required for producing said preselected change in the pattern of intensities.

References Cited
UNITED STATES PATENTS

| | | | |
|---|---|---|---|
| 2,463,321 | 3/1949 | Scott | 88—14 |
| 2,578,625 | 12/1951 | Bowers et al. | 88—14 |
| 3,057,185 | 10/1962 | Van Horne et al. | 250—202 X |
| 3,099,748 | 7/1963 | Weiss | 250—203 |

WALTER STOLWEIN, *Primary Examiner.*